Figure 1:
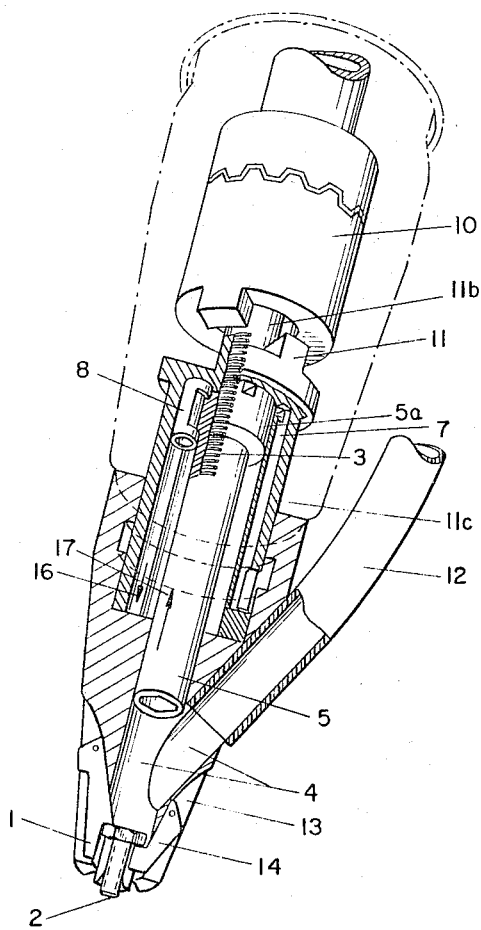

Dec. 27, 1966  H. M. DÖRRER  3,294,130
PNEUMATIC SCREW DRIVER
Filed July 17, 1963

INVENTOR
HERBERT M. DÖRRER

3,294,130
PNEUMATIC SCREW DRIVER

Herbert M. Dörrer, Muhlhausen, Kreis Pforzheim, Germany, assignor to International Standard Electric Corporation, New York, N.Y., a corporation of Delaware
Filed July 17, 1963, Ser. No. 295,780
Claims priority, application Germany, July 25, 1962,
St 19,524
5 Claims. (Cl. 144—32)

This invention relates to pneumatic tools and more particularly to pneumatic screw drivers which employ automatic screw feeds in which a screw is first engaged by a bit in a non-rotating condition and then, by the action of a clutch mechanism, is rotatably driven to join materials in a desired manner.

Every day innumerable screw connections have to be made in industries which utilize production line techniques. For many years, high-speed adjustable-torque pneumatic screw drivers have been utilized which permit effective and rapid insertion and tightening of screws.

Using certain prior art pneumatic screw drivers, up to now, it was necessary to position the screw by hand and to turn it once or twice in the thread before the automatic screw driver could be utilized. Later prior art devices which operate with an automatic screw feed improved on the earlier devices. Such automatic screw drivers however, can only be operated in the vertical position or in a position slightly deviating therefrom, and are thus unsuitable in situations which require screw insertion from the horizontal direction, for instance.

It is therefore an object of this invention to provide a pneumatic screw driver which is an improvement over prior art screw drivers.

Another object is to provide a pneumatic screw driver which incorporates a screw holding arrangement which provides for positive holding of the screw regardless of the tool position.

A further object is to provide a pneumatic screw driver having a bit which in a sequential manner first rectilinearly advances to engage a screw head and then rotatably drives the screw, this last mentioned arrangement cooperating with screw-holding arrangement.

A feature of this invention is the utilization of a plurality of claws and pawls which cooperatively act upon a screw head to maintain the screw in a fixed axial position until the screw head is engaged by the rectilinear motion of a bit.

Another feature of this invention is the utilization of means for providing a rectilinear motion to a bit, means for applying rotary motion to the bit, the rectilinear and rotary motion of the bit cooperating to release the screw from the claw-and-pawl retaining mechanism.

A further feature of this invention is the utilization of a clutch mechanism, the engagement of which is accomplished at a given time by the action of compressed air acting first to overcome the force of a tensioning means coupled to the screw insert and then acting to overcome the force of a compressive means which holds the clutch faces apart.

Figure 2:
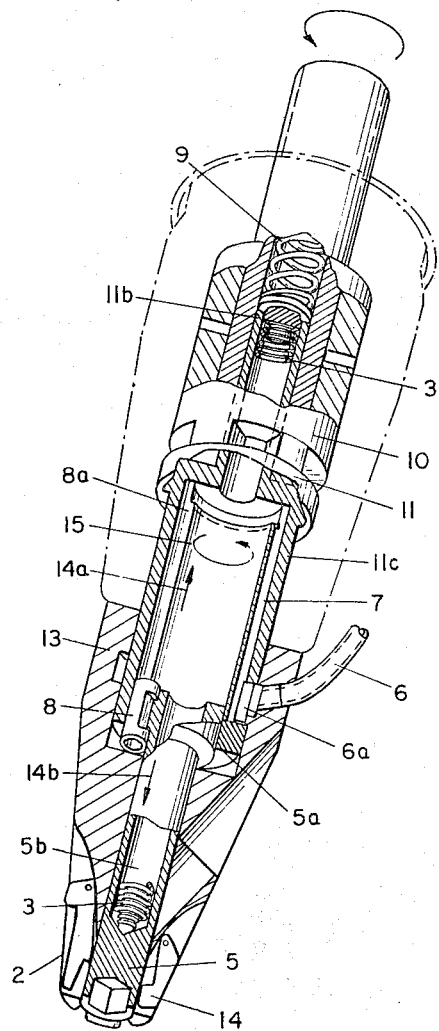

The above-mentioned and other features and objects of this invention will become more apparent by reference to the following description taken in conjunction with the accompanying drawings, in which:

FIG. 1 shows a view of a preferred embodiment of the invention partly in perspective and partly in section in which all the parts of the screw driver are in the non-operated condition; and FIG. 2 shows a view of the screw driver partly in perspective and partly in section in which all the moving parts are shown in their fully operated condition.

The invention is characterised by the fact that the bit of this pneumatic screw driver is controllable in the axial direction in such a way that upon switching-on the compressed air, the bit is first of all moved toward the screw, and then the clutch, which is cable of being coupled in a rigid manner, preferably by utilizing the reaction moment appearing at a complete extension of the bit, is engaged.

In accordance with this invention, the bit and the clutch can be actuated in opposition to the action of spring assemblies which are so designed that the bit is moved toward the screw before the clutch for driving the bit is engaged.

In the embodiment shown in FIGS. 1 and 2, all stationary parts, guiding and protecting sleeves and envelopes, and other feed members which are not necessary for understanding the invention, have been omitted.

Referring now to FIG. 1, the screw 1 is shown being held in position by three claws 14 disposed circumferentially about the mouthpiece 13 of the screw driver. Three pawls 2 also circumferentially disposed about mouthpiece 13 prevent the screw from sliding back upon application to the work piece. The piston of the bit 5, which is provided at its lower end with a recess or opening adapted to the shape of the screw heads, can be rectilinearly moved by the application of air pressure to project into mouthpiece 13 of the screw driver. The upper end of the bit 5 extends into the head of the piston 5a. Moreover, the bit 5 is provided with a bore 5b. To the lower end of bore 5b is connected one end of a spring 3 which extends axially of the screw driver, and which, at its other end, is attached to the upper portion of a sleeve 11b which is closed by a cover (not shown). A sleeve 11b and the lower portion of the clutch 11, with a cylindrical extension 11c, form one unit and are designed so as to be capable of being turned as well as displaced in the axial direction. The torque of the clutch 11 or of the cylinder 11c respectively is transferred to the bit 5 via a roller 8. Roller 8 is axially displaceable within a groove 8a of the cylinder 11c, so that the bit 5, besides being rotatable, can also be displaced axially.

A channel system 7 is provided in cylinder 11c serving the compressed air intake. The compressed air is led through an air-duct 6 and bores 6a into the channel system 7. To insure a supply of compressed air during the rotation of cylinder 11c, another cylinder (not shown) is slipped over the lower portion of cylinder 11c such that compressed air is delivered from air duct 6 at the height of supply bores 6a internally of cylinder 11c by means of a ring shaped or annular groove. By this means, compressed air can be introduced in every position of rotation of the bores 6a. At its upper end, the channel system 7 opens toward the inside in the radial direction, so that the compressed air has access, on one hand, to the surface of the head 5a of the bit 5 and to the bore 5b of the bit 5 and, on the other hand, to the surface of the clutch 11 and the sleeve 11b.

The screw 1 is fed to the mouthpiece 13 of the screw driver through a plastic tube 12 and a bore 4 by compressed air.

Referring now to FIG. 2, the operating cycle of the screw driver will be described in what follows. At the termination of the last operating cycle, the screw 1 has been brought into the proper position, and projects from the mouthpiece 13 of the screw driver, with the screw being held by both the claws 14 and the pawls 2. In this position, (see FIG. 1) the mouthpiece 13 of the screw driver, with the screw projecting from mouthpiece 13, is positioned by the operator into a screw hole. Thereupon, a hand-operated valve is pressed down for effecting the flow of compressed air into the screw driver turbine, thus causing the sliding clutch 10 to rotate. By the action of the spring 9 via the sleeve 11b, the clutch 11 is still disengaged and therefore does not participate in the rotation, because the sliding clutch 10 is also freely rotatable in relation to the sleeve 11b. Simultaneously with the supply of compressed air to the screw driver turbine, via the air-duct 6 and the channel system 7, compressed air is also supplied to the head 5a of bit 5 and to the bore 5b. Air is also supplied to clutch 11 and to the inside of the sleeve 11b rigidly connected thereto. The springs 3 and 9, however, are so designed that spring 3, normally in tension, reacts to the pressure, to cause, at first, only axial movement of bit 5. Because of the build-up of pressure, bit 5 is moved, in opposition to the tensioning action of the spring 3, against screw 1. Roller 8, in the course of this motion, slides in the groove 8a until it strikes the limiting stop and remains in this position. Roller 8 provides for coupling between cylinder 11c and head 5a so that the rotary motion of cylinder 11c is transmitted to bit 5 when clutch portions 10 and 11 engage. The rectilinear motion of bit 5 against spring 3 engages the head of the screw 1 or becomes engaged after a short rotation.

Only now, after the bit 5, and the head 5a of bit 5, have been moved out until meeting against the limiting stop, does the pressure of the compressed air exerted upon the clutch 11 and the sleeve 11b come into play. The reaction moment as created within the cylinder system by the compressed air serves to engage the clutch 11 to the claws of the already rotating sliding clutch 10 in opposition to the compressional pressure of the spring 9.

In this manner, a rotating motion is transferred by the clutches 10, 11, the cylinder 11c, the roller 8 and the head 5a of the piston, to the bit 5 and, consequently, to the screw 1. The pawls 2 are spread outwardly into the mouthpiece 13 during the screwing process due to the starting torque of the screw 1 and the bit 5 pressing against the screw. (Arrows 14a and 14b indicate the direction of motion which is given to the sliding parts by the compressed air, and arrow 15 indicates the rotation which is likewise caused by compressed air.)

When screw 1 is properly tightened, the operator closes a hand-operated valve and the air motor runs down. Because of this, the cylinder system of the clutch 11 is evacuated in a direction oppositely to that of the supply (intake). The pressure against the spring 3 is released, so that this spring returns the head 5a of the piston, as well as the bit 5, to its initial position (FIG. 1). Due to the elimination of the pressure caused by the compressed air, the compressive force of the spring 9 becomes effective again, and clutch 11 is disengaged from the sliding clutch 10 by action of spring 9 on the sleeve 11b and, consequently, upon the clutch 11. The downward movement of the clutch 11 is limited by the lower limit stop between the cylinder 11c and the mouthpiece 13. Arrow 16 is FIG. 1 indicates the direction of movement of the cylinder 11c, and arrow 17 in FIG. 1 indicates the direction of motion of the bit 5 in this stage of operation.

Upon closing of the hand-operated valve, an electrical pulse is simulaneously transmitted to the sorting device causing the feed-in of a further screw. This screw, in the manner already described hereinabove, is fed by a stream of air to the mouthpiece 13 of the screw driver, and is retained in position by the claws 14, whereas the pawls 2 prevent the screw 1 from sliding back while the screw driver with the screw in position, is applied to the work piece. In this way, the screw driver is prepared for the next operating cycle.

While I have described the principles of my invention in connection with specific apparatus, it is to be clearly understood that this description is made only by way of example and not as a limitation to the scope of my invention as set forth in the accompanying claims.

I claim:
1. A pneumatic screw driver having a housing and automatic screw-feeding means coupled thereto comprising means for retaining a screw in a fixed position in the mouthpiece of said housing, means for applying a rectilinear component of motion to said screw to disengage said screw from said retaining means, and means for applying a rotary component of motion to said screw, said means for applying a rectilinear component of motion to said screw comprising a bit adapted to move axially within said housing toward said mouthpiece, a piston coupled to one end of said bit, said bit and said piston having a bore, tensioning means partially disposed within said bore and having a first extremity fixed within said bore, a cylindrical barrel within said housing and slidably mounted for axial motion therein, said bit and said piston being moveably disposed within said barrel, a cylindrical sleeve closed at a fixed end thereof and flanged at the other end thereof, said cylindrical sleeve being coupled at said flanged end to said barrel, said tensioning means being fixed at its second extremity to said closed end of said sleeve, means for applying compressed air internally of said barrel to act upon said piston and said bit to produce rectilinear motion thereof, and clutch means coupled to said bit to allow rotary motion of said bit only subsequent to rectilinear motion thereof.

2. A pneumatic screw driver according to claim 1 wherein said tensioning means comprises a coiled spring which holds said piston and said bit adjacent the flanged end of said sleeve when compressed air is off.

3. A pneumatic screw driver according to claim 1, wherein said clutch means comprises an upper driving portion and a lower driven portion, said cylindrical barrel being rigidly connected to said lower driven portion of said clutch means, and said cylindrical sleeve having an outer surface which is adapted to act as a bearing surface for said upper driving portion of said clutch means, said screw driver further including compressive means disposed between said closed end of said sleeve and said housing to hold apart said upper and said lower portions of said clutch means, and means connecting said barrel and said piston to transmit rotary motion to said bit, said means for applying compressed air internally of said barrel being adapted further to compress said compressive means by the action of the air moving said cylindrical sleeve against said compressive means, thereby engaging said upper and said lower portions of said clutch means and imparting rotary motion to said bit through said barrel, said clutch means, and said piston.

4. A pneumatic screw driver according to claim 3 wherein said compressive means comprises a coiled spring.

5. A pneumatic screw driver according to claim 3 wherein said means connecting said barrel and said piston includes a roller.

References Cited by the Examiner
UNITED STATES PATENTS

| | | | |
|---|---|---|---|
| 2,818,893 | 1/1958 | Shaff | 144—32 |
| 2,820,494 | 1/1958 | Haberstump | 144—32 |
| 2,870,805 | 1/1959 | Zakrzewski | 144—32 |

DONALD R. SCHRAN, *Primary Examiner.*